US 10,486,799 B2

(12) United States Patent
Baird (10) Patent No.: US 10,486,799 B2
(45) Date of Patent: Nov. 26, 2019

(54) ROD END (71) Applicant: GOODRICH CORPORATION, Charlotte, NC (US)

(72) Inventor: Bradley William Baird, Grimsby (CA)

(73) Assignee: GOODRICH CORPORATION, Charlotte, NC (US)

(*) Notice: Subject to any disclaimer, the term of this patent is extended or adjusted under 35 U.S.C. 154(b) by 408 days.

(21) Appl. No.: 15/185,504

(22) Filed: Jun. 17, 2016

(65) Prior Publication Data
US 2017/0313414 A1 Nov. 2, 2017

Related U.S. Application Data (60) Provisional application No. 62/329,822, filed on Apr. 29, 2016.

(51) Int. Cl.
B64C 25/18 (2006.01)
B64C 25/34 (2006.01)
F15B 15/14 (2006.01)
B64C 25/22 (2006.01)

(52) U.S. Cl.
CPC ............. B64C 25/18 (2013.01); B64C 25/22 (2013.01); B64C 25/34 (2013.01); F15B 15/1447 (2013.01); F15B 15/1457 (2013.01)

(58) Field of Classification Search
CPC ...... F16J 7/00; B60G 2204/418; B64C 25/34; B64C 25/18; B64C 25/60; B64C 25/22; F15B 15/1447; F15B 15/1457
See application file for complete search history.

(56) References Cited

U.S. PATENT DOCUMENTS

| 3,279,561 A * | 10/1966 | Flanagan | F15B 15/1457 184/24 |
| 3,822,048 A | 7/1974 | Hartel | |
| 4,005,514 A * | 2/1977 | McCloskey | F16C 23/045 29/898.043 |
| 4,780,000 A * | 10/1988 | Lewis | F16C 11/0614 384/203 |
| 5,363,743 A | 11/1994 | Raddatz et al. | |
| 8,596,575 B2 | 12/2013 | Ito et al. | |
| 2013/0213215 A1 | 8/2013 | Xu | |

FOREIGN PATENT DOCUMENTS

WO 2016014676 1/2016

OTHER PUBLICATIONS

EP Search Report dated Aug. 16, 2017 in EP Application No. 17168842.7.

* cited by examiner

Primary Examiner — Abiy Teka
(74) Attorney, Agent, or Firm — Snell & Wilmer, L.L.P.

(57) ABSTRACT

A rod end of an actuator assembly is disclosed. The rod end may comprise a rod piston end having an outer profile, and a rod joint end opposite the rod piston end, wherein the outer profile comprises an elliptical shape comprising a major diameter and a minor diameter, wherein the major diameter may be larger than the minor diameter in length.

18 Claims, 7 Drawing Sheets

ROD END

CROSS REFERENCE TO RELATED APPLICATIONS

This application is a nonprovisional of, claims priority to, and the benefit of, U.S. Provisional Patent Application Ser. No. 62/329,822 filed on Apr. 29, 2016 entitled "ROD END", which is incorporated by reference herein in its entirety for all purposes.

FIELD

This disclosure generally relates to landing gear assemblies in aircraft, and specifically to a rod end in a landing gear assembly.

BACKGROUND

Landing gear assemblies are configured to retract the landing gear of an aircraft after takeoff and/or deploy the landing gear before landing. The landing gear assembly may be coupled to a wing of the aircraft by an actuator. A rod end of the actuator may couple the actuator to the rest of the landing gear assembly. During retraction or deployment of the landing gear assembly, a mechanical load is applied through the rod end to retract and/or deploy the landing gear. This cycling occurs each flight, and over time, the rod end may experience fatigue damage which may reduce the expected life of the rod end. Rod ends also typically exist on other actuators on landing gear assemblies.

SUMMARY

A rod end is disclosed herein. In various embodiments, a rod end of an actuator assembly may comprise a rod piston end having an outer profile, and a rod joint end opposite the rod piston end, wherein the outer profile comprises an elliptical shape comprising a major diameter and a minor diameter, wherein the major diameter may be larger than the minor diameter in length. In various embodiments, the major diameter may be between 0.5% and 10% larger than the minor diameter in length. In various embodiments, the major diameter may be between 3% and 7% larger than the minor diameter in length. In various embodiments, a minor diameter of the outer profile may be between 120 millimeters and 130 millimeters. In various embodiments, a major diameter of the outer profile may be between 125 millimeters and 135 millimeters.

In various embodiments, the rod piston end may comprise an internal surface radially inward of the outer profile, wherein the internal surface comprises threading. In various embodiments, the rod joint end may comprise a spherical bearing disposed within a void through the rod joint end, wherein the void is defined by an outer edge. In various embodiments, the rod joint end may comprise a pin disposed radially inward of the spherical bearing, and disposed adjacent to the spherical bearing. In various embodiments, the rod joint end may comprise a greater spool disposed radially inward of the pin, and disposed adjacent to the pin.

In various embodiments, a landing gear assembly may comprise an actuator assembly, comprising a housing comprising a proximal end, a distal end, and a piston chamber inside the housing between the proximal end and the distal end, a piston disposed within the piston chamber, the piston comprising a piston first end and a piston second end, and a rod end coupled to the piston second end, the rod end comprising a rod piston end having an outer profile, wherein the outer profile comprises an elliptical shape comprising a major diameter and a minor diameter, wherein the major diameter may be larger than the minor diameter in length. In various embodiments, the major diameter may be between 0.5% and 10% larger than the minor diameter in length. In various embodiments, the major diameter may be between 3% and 7% larger than the minor diameter in length. In various embodiments, a minor diameter of the outer profile may be between 120 millimeters and 130 millimeters. In various embodiments, the major diameter of the outer profile may be between 125 millimeters and 135 millimeters.

In various embodiments, the landing gear assembly may comprise an outer cylinder coupled to a rod joint end of the rod end, wherein the rod joint end is opposite the rod piston end of the rod end, and the outer cylinder comprises an inner surface that surrounds the outer profile of the rod end. In various embodiments, a first distance between a minor diameter of the outer profile and the inner surface of the outer cylinder may be between 4 millimeters and 5 millimeters. The first distance may be 4.5 millimeters. In various embodiments, a second distance between a major diameter of the outer profile and the inner surface of the outer cylinder may be greater than 25 millimeters.

In various embodiments, a method of assembling a landing gear assembly may comprise providing a rod end having an outer profile, wherein the outer profile comprises an elliptical shape, and coupling a second end of a piston to a rod piston end of the rod end. The elliptical shape of the outer profile may comprise a major diameter and a minor diameter, wherein the major diameter may be larger than the minor diameter in length. The method may further comprise coupling a rod joint end of the rod end to an outer cylinder of the landing gear assembly.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with the like element numbering throughout the figures are intended to be the same.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
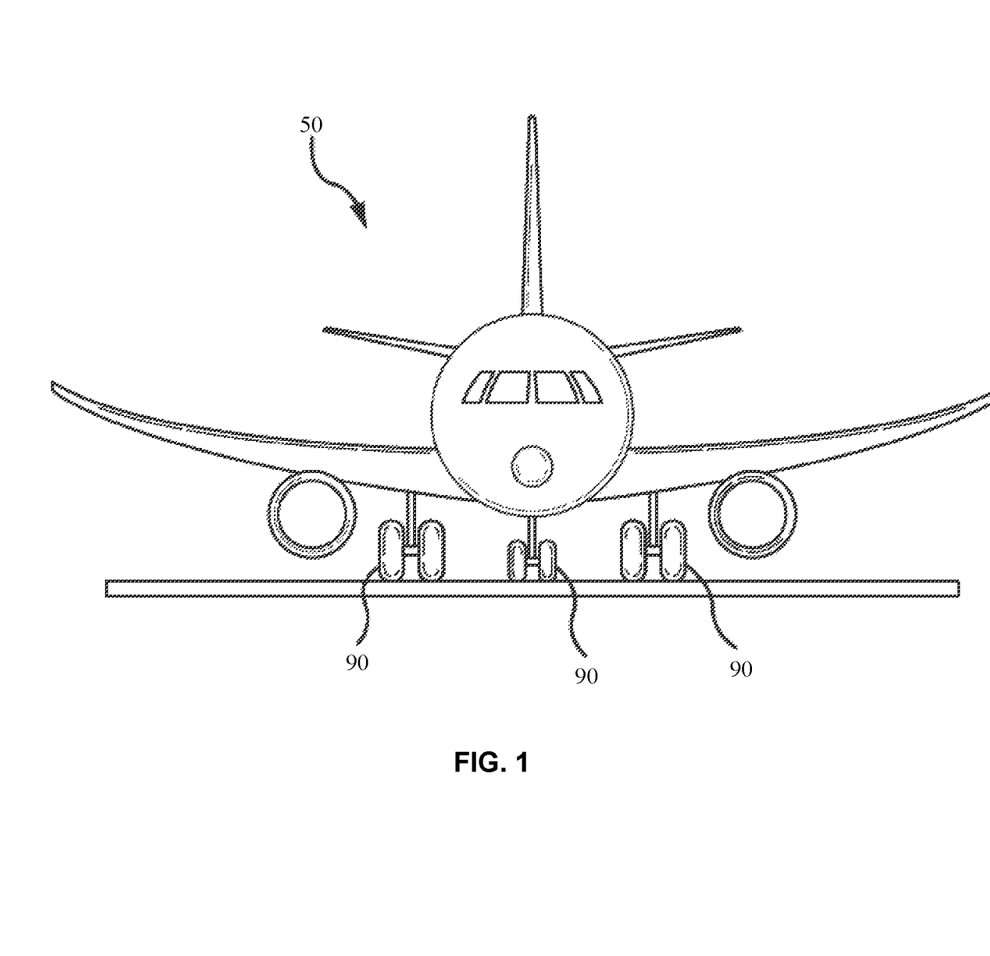
FIG. 1 illustrates a perspective view of an aircraft, in accordance with various embodiments.
Figure 2:
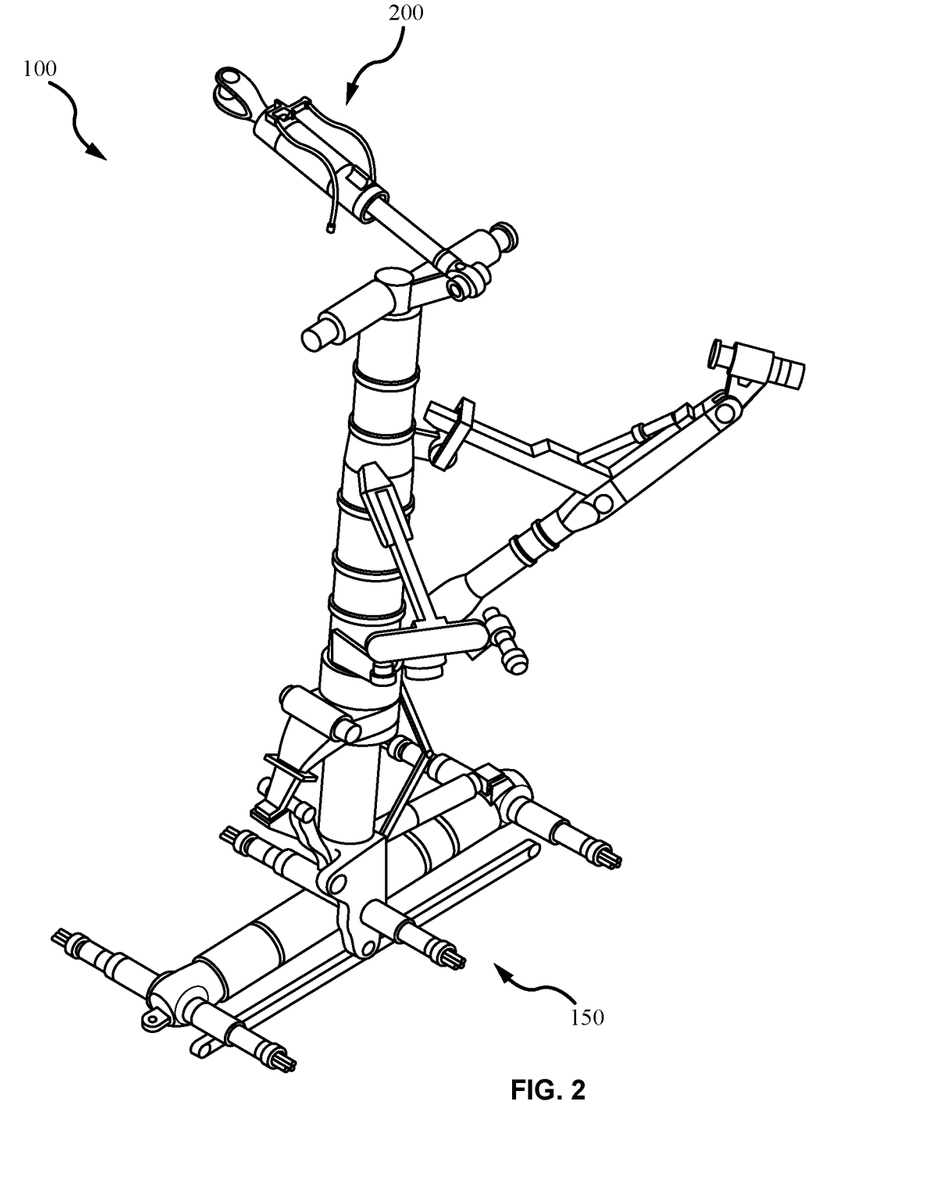
FIG. 2 illustrates a perspective view of a landing gear assembly, in accordance with various embodiments.
Figure 3:
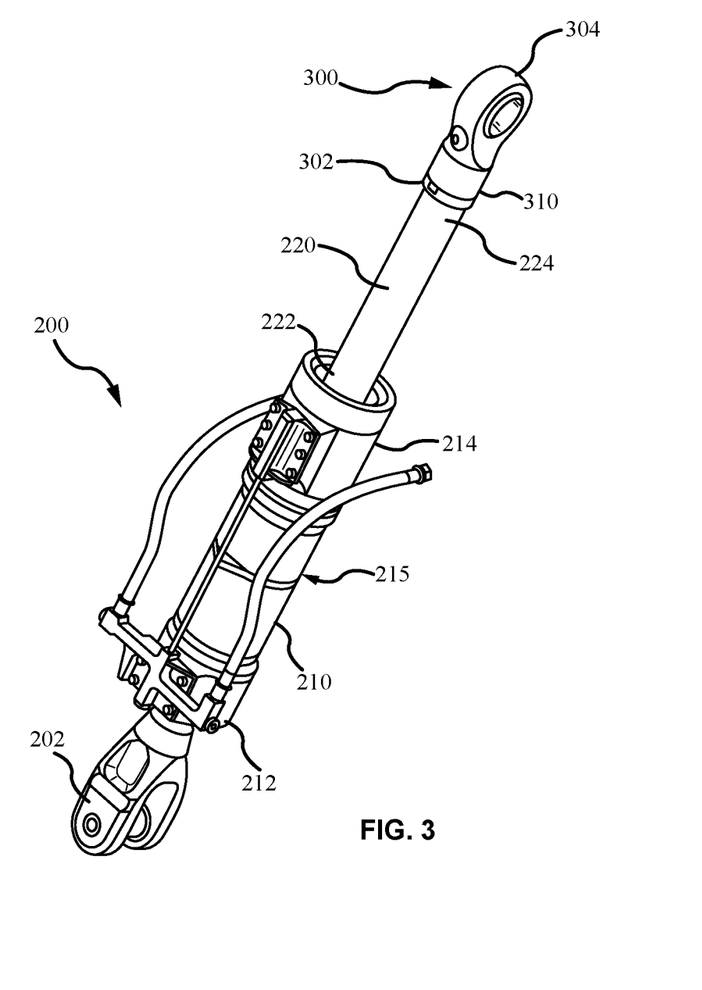
FIG. 3 illustrates a perspective view of an actuator assembly, in accordance with various embodiments.

Aircraft, such as aircraft 50 depicted in FIG. 1, may comprise landing gear 90 which provides mobility for aircraft 50 while on the ground. Referring to FIGS. 2 and 3, an aircraft may comprise a landing gear assembly 100 configured to retract landing gear after takeoff and/or deploy landing gear before landing. Wheel end 150 of landing gear assembly 100 may couple to the wheels of the aircraft. Actuator assembly 200 of landing gear assembly 100 may couple to the wing of an aircraft by a wing end 202 of actuator assembly 200. Actuator assembly 200 may comprise a housing 210 comprising a proximal end 212 coupled to wing end 202, a distal end 214 opposite proximal end 212, and a piston chamber 215 within housing 210 and between proximal end 212 and distal end 214. Housing 210 may be coupled to, and configured to house a piston 220, which may translate in and out piston chamber 215 through distal end 214 of housing 210. Piston 220 may comprise a piston first end 222 coupled to housing 210, and a piston second end 224 opposite piston first end 222.

Figure 4:
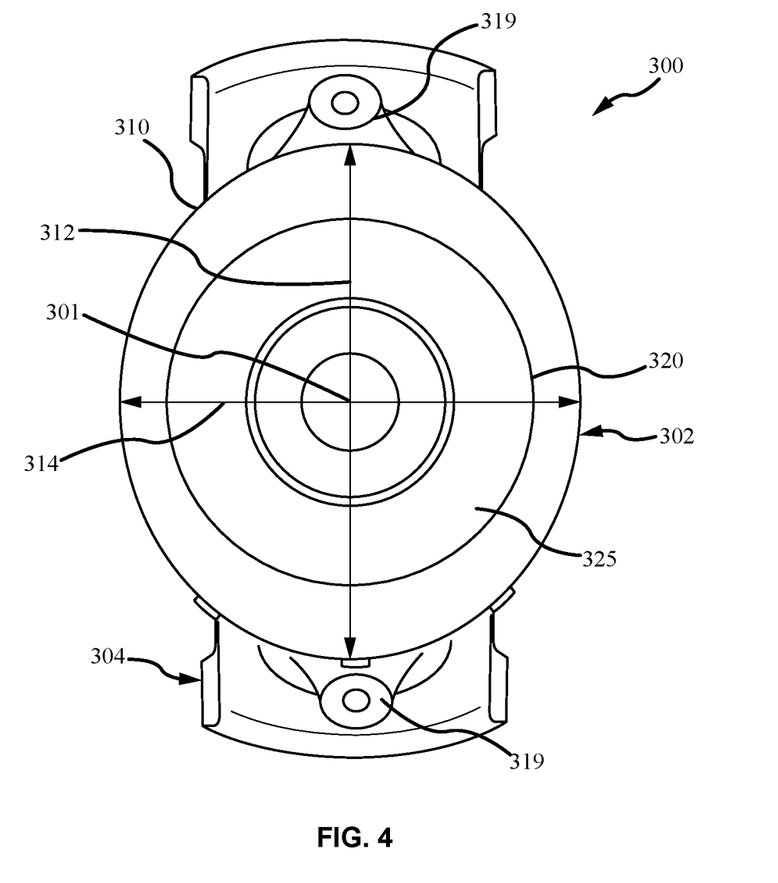
FIG. 4 illustrates a perspective view of a rod end, in accordance with various embodiments.

In various embodiments, a rod end 300 may be coupled to piston second end 224. Rod end 300 may couple actuator assembly 200 to the rest of landing gear assembly 100. Therefore, during operation of landing gear assembly 100, a significant mechanical load is applied to rod end 300 because rod end 300 supports the rest of landing gear assembly 100. Referring to FIGS. 3 and 4, in various embodiments, rod end 300 may comprise a rod piston end 302 coupled to piston 220, and a rod joint end 304 opposite rod piston end 302. Rod piston end 302 may comprise an outer profile 310, which comprises the outer surface of rod piston end 302. In various embodiments, outer profile 310 may be an elliptical shape comprising a major diameter 312 and a minor diameter 314. Major diameter 312 is larger than minor diameter 314 in length. In various embodiments, major diameter 312 may be between 0.5% and 10% larger than minor diameter 314 in length. In various embodiments, major diameter 312 may be between about 3% and about 7% larger than minor diameter 314 in length. In various embodiments, major diameter 312 may be between about 4% and about 5% larger than minor diameter 314 in length. As used in this context only, the term "about" means plus or minus 1%.

In various embodiments, major diameter 312 may be between 125 millimeters (4.92 inches) and 135 millimeters (5.31 inches), or between 127 millimeters (5.0 inches) and 133 millimeters (5.24 inches). In various embodiments, major diameter 312 may be about 130 millimeters (5.12 inches). In various embodiments, minor diameter 314 may be between 120 millimeters (4.72 inches) and 130 millimeters (5.12 inches), or between 122 millimeters (4.80 inches) and 128 millimeters (5.04 inches). In various embodiments, minor diameter 314 may be about 124 millimeters (4.88 inches). As used with respect to major diameter 312 and minor diameter 314 only, the term "about" means plus or minus 2 millimeters (0.079 inch).

Figure 5:
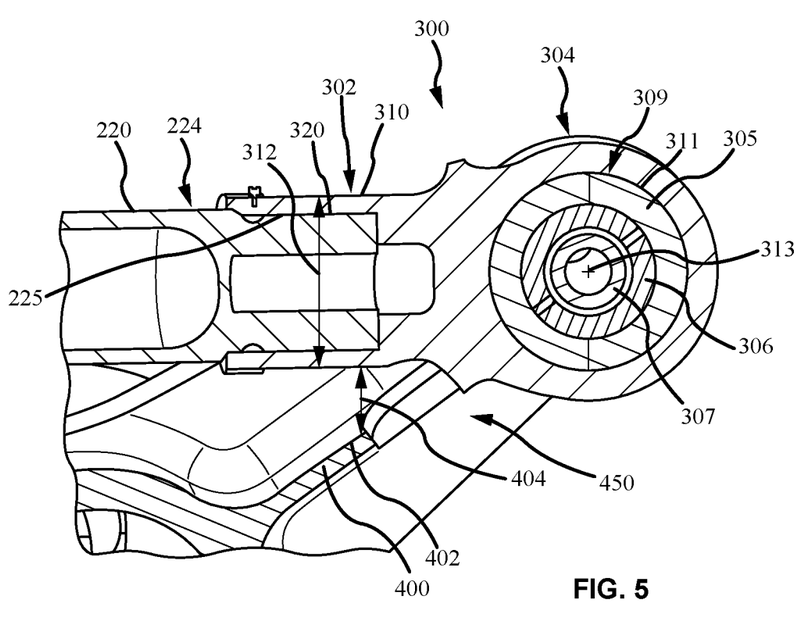
FIG. 5 illustrates a perspective view of a rod end coupled to a landing gear assembly, in accordance with various embodiments.

In various embodiments, rod piston end 302 may comprise an internal surface 320 radially inward of outer profile 310 relative to point 301. Internal surface 320 may comprise threading complementary to threading of an external surface 225 on piston second end 224 (as depicted in FIG. 5), by which piston 220 and rod end 300 may couple. Piston 220 may couple to rod end 330 (e.g., by internal surface 320 coupling to external surface 225) in any other suitable manner such as through an adhesive, interference fit, press fit, and/or the like. Piston 220 may be disposed in piston receiving area 325 of rod end 300 in response to piston 220 being coupled to rod end 300. In various embodiments, rod end 300 may comprise one or more grease bosses 319 on rod joint end 304. Grease bosses 319 may be configured to receive a grease applicator in order to lubricate the components of rod joint end 304.

In various embodiments, with reference to FIG. 5, rod joint end 304 of rod end 300 may comprise a void 309 defined by an outer edge 311. Disposed within void 309, adjacent to outer edge 311, may be a spherical bearing 305. Radially inward of spherical bearing 305, relative to center point 313, a pin 306 may be disposed adjacent to spherical bearing 305. Pin 306 may couple an outer cylinder 400 of landing gear assembly 100 (depicted in FIG. 2) to rod end 300. Spherical bearing 305 may allow rotation of rod end 300 about pin 306. In various embodiments, a greater spool 307 may be disposed radially inward of, relative to center point 313, and adjacent to pin 306. Greater spool 307 may transfer grease into rod joint end 304 and the components disposed within void 309 to help lubricate the components.

Figure 6:
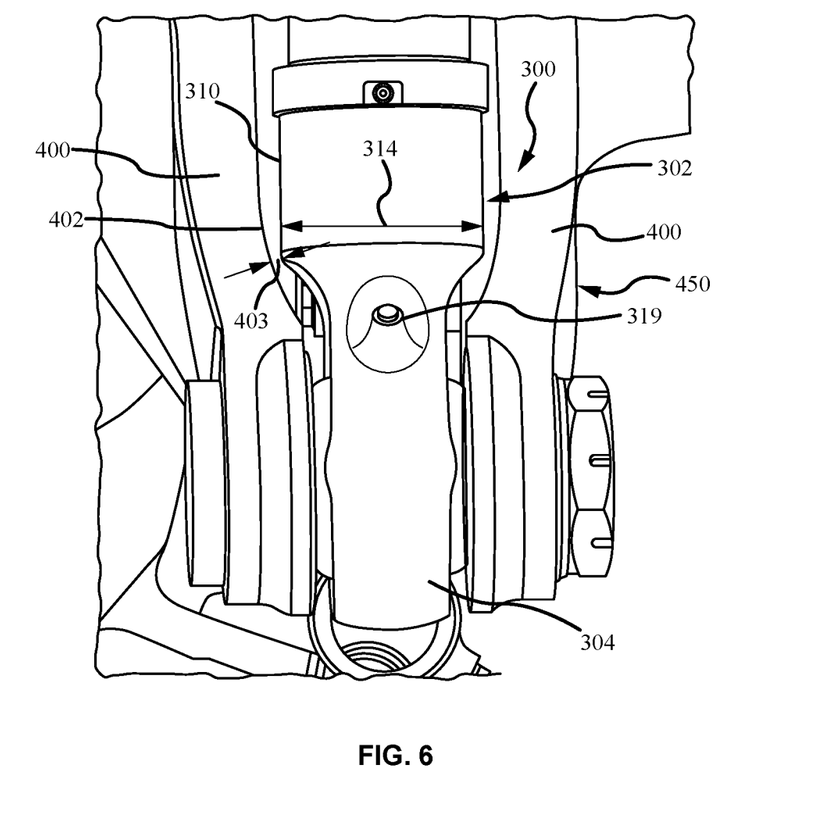
FIG. 6 illustrates another perspective view of a rod end coupled to a landing gear assembly, in accordance with various embodiments.

With reference to FIGS. 5 and 6, in various embodiments, rod joint end 304 of rod end 300 may be coupled to outer cylinder 400. As described herein, rod end 300 may be coupled to outer cylinder 400 by pin 306. Outer cylinder 400 may comprise an inner surface 402 which surrounds outer profile 310 of rod piston end 302. In order for landing gear assembly 100 (depicted in FIG. 2) to operate optimally, there should be adequate clearance between inner surface 402 and outer profile 310 when rod end 300 and outer cylinder 400 are in any positions relative to one another, including a configuration which disposes inner surface 402 and outer profile 310 closest to one another. Such a configuration may be referred to as close configuration 450. Therefore, to form the elliptical shape of outer profile 310 of rod end 300, material of rod piston end 302 may be biased away from a small clearance area 403 depicted in FIG. 6 (for example, 90 degrees away from small clearance area 403) between rod end 300 and outer cylinder 400, to a large clearance area 404 depicted in FIG. 5, between rod end 300 and outer cylinder 400. In close configuration 450, large clearance area 404 may be associated with major diameter 312 of the elliptical shape of outer profile 310. In close configuration 450, small clearance area 403 may be associated with minor diameter 314 of the elliptical shape of outer profile 310. In various embodiments, small clearance area 403 may be between 4 millimeters (0.16 inch) and 5 millimeters (0.20 inch), or between 4.2 millimeters (0.17 inch) and 4.8 millimeters (0.19 inch). In various embodiments, small clearance area 403 may be about 4.5 millimeters (0.18 inch), wherein the term "about", as used in this context only, means plus or minus 2 millimeters (0.08 inch). In various embodiments, large clearance area 404 may be between 15 millimeters (0.59 inch) and 25 millimeters (0.98 inch). In various embodiments, large clearance area 404 may be greater than about 25 millimeters (0.98 inch), wherein the term "about", as used in this context only, means plus or minus 2 millimeters (0.08 inch).

Rod end 300 may be comprised of steel. Rod end 300 comprising the elliptical shape of outer profile 310, which may include the measurements of major diameter 312 and minor diameter 314 as described herein, may provide adequate clearance between outer profile 310 and inner surface 402 of outer cylinder 400 of the landing gear assembly, while achieving a sufficient strength of rod end 300. The elliptical shape of outer profile 310 may also achieve a sufficient fatigue life of rod end 300 without the need for a less fatigue-sensitive metal alloy, such as a steel alloy comprising, by weight, 14-15.5 percent chromium, 2.5-4.5 percent copper, 3.5-5.5 percent nickel, 0.15-0.45 percent niobium, and a maximum of 0.07 percent carbon, 1 percent manganese, 0.014 percent phosphorus, 1 percent silicon, and 0.03 percent sulfur, known in the industry as "Stainless Steel 15-5." However, it would not be outside the scope of this disclosure for rod end 300 to comprise any other suitable material. The bias of mass toward major diameter 312 adds strength to rod end 300, while providing adequate clearance in small clearance area 403 and large clearance area 404.

Figure 7:
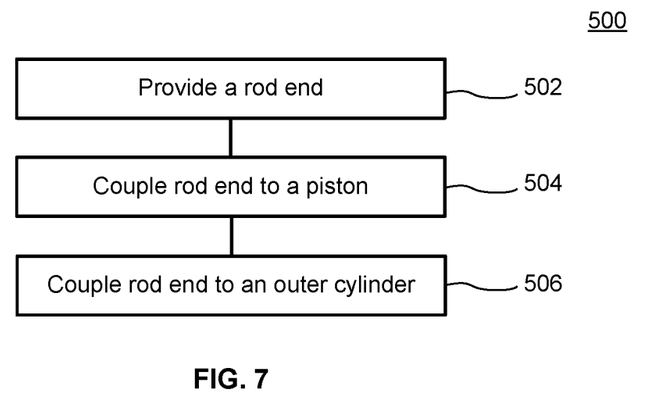
FIG. 7 illustrates a method for installing a rod end, in accordance with various embodiments.

Referring to FIG. 7, a method of installing a rod end 500 is depicted, in accordance with various embodiments. With combined reference to FIGS. 4-7, a rod end 300 may be provided (step 502). As used in the context of the method of installing a rod end 500, "provide", "provided", or "providing" means making rod end 300 (manufacturing, assembling, and/or the like) or acquiring rod end 300 from a third party. Rod end 300 may be manufactured via any suitable manufacturing method such as subtractive machining, including turning, drilling, milling, electrical discharge machining, or the like, and/or additive manufacturing. Rod end 300 may be comprised of steel or any other suitable material, as discussed herein. In various embodiments, rod end 300 may be coupled to piston 220 (step 504). Rod piston end 302 of rod end 300 may couple to piston second end 224 of piston 220 in any suitable manner. For example, rod piston end 302 may comprise an internal surface 320 radially inward of outer profile 310 relative to point 301, as discussed herein. Piston second end 224 may comprise an external surface 225, which may comprise threading complementary to threading on internal surface 320, by which piston 220 and rod end 300 may couple. In various embodiments, piston 220 may couple to rod end 330 (e.g., by internal surface 320 coupling to external surface 225) in any other suitable manner such as an adhesive, interference fit, press fit, and/or the like. In various embodiments, rod end 300 may be coupled to outer cylinder 400 (step 506). Rod joint end 304 may be coupled to outer cylinder 400 by pin 306 being inserted through outer cylinder 400 and through void 309 in rod joint end 304. Rod end 300 and outer cylinder may be coupled in any other suitable manner, such that rod end 300 and outer cylinder 400 are able to rotate about center point 313. As described herein, outer profile 310 of rod end 300 may comprise an elliptical shape, which may include the dimensions discussed herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rod end of an actuator assembly, comprising:
   a rod piston end having an outer profile, wherein the rod piston end is configured to couple to a piston of an actuator assembly; and
   a rod joint end opposite the rod piston end, wherein the rod joint end is configured to couple to an outer cylinder to form a joint such that the rod end and the outer cylinder may rotate relative to one another, wherein the outer profile of the rod piston end comprises an elliptical shape comprising a major diameter and a minor diameter, wherein the major diameter is larger than the minor diameter in length; wherein the major diameter is between 0.5% and 10% larger than the minor diameter in length.

2. The rod end of claim 1, wherein the major diameter is between about 3% and about 7% larger than the minor diameter in length.

3. The rod end of claim 1, wherein the minor diameter of the outer profile is between 120 millimeters and 130 millimeters.

4. The rod end of claim 3, wherein the major diameter of the outer profile is between 125 millimeters and 135 millimeters.

5. The rod end of claim 1, wherein the rod piston end comprises an internal surface radially inward of the outer profile, wherein the internal surface comprises threading.

6. The rod end of claim 1, wherein the rod joint end comprises a spherical bearing disposed within a void through the rod joint end, wherein the void is defined by an outer edge.

7. The rod end of claim 6, further comprising a pin disposed radially inward of the spherical bearing, and disposed adjacent to the spherical bearing.

8. The rod end of claim 7, further comprising a greaser spool disposed radially inward of the pin, and disposed adjacent to the pin.

9. A landing gear assembly, comprising
an actuator assembly, comprising:
  a housing comprising a proximal end, a distal end, and a piston chamber inside the housing between the proximal end and the distal end;
  a piston disposed within the piston chamber, the piston comprising a piston first end and a piston second end opposite the first piston end, wherein the piston first end is coupled to the housing; and
  a rod end comprising a rod piston end having an outer profile and a rod joint end opposite the rod piston end, wherein the rod piston end is coupled to the piston second end, wherein the outer profile comprises an elliptical shape comprising a major diameter and a minor diameter, wherein the major diameter is larger than the minor diameter in length;
  wherein the major diameter is between 0.5% and 10% larger than the minor diameter in length.

10. The landing gear of claim 9, wherein the major diameter is between about 3% and about 7% larger than the minor diameter in length.

11. The landing gear assembly of claim 9, wherein the minor diameter of the outer profile is between 120 millimeters and 130 millimeters.

12. The landing gear assembly of claim 11, wherein the major diameter of the outer profile is between 125 millimeters and 135 millimeters.

13. The landing gear assembly of claim 9, further comprising an outer cylinder coupled to a rod joint end of the rod end, wherein the rod joint end is opposite the rod piston end of the rod end, and the outer cylinder comprises an inner surface that surrounds the outer profile of the rod end.

14. The landing gear assembly of claim 13, wherein a first distance between the minor diameter of the outer profile and the inner surface of the outer cylinder is between 4 millimeters and 5 millimeters.

15. The landing gear assembly of claim 14, wherein the first distance is 4.5 millimeters.

16. The landing gear assembly of claim 13, wherein a second distance between the major diameter of the outer profile and the inner surface of the outer cylinder is greater than 25 millimeters.

17. A method of assembling a landing gear assembly, comprising:
  providing a rod end comprising a rod piston end and a rod joint end, the rod piston end having an outer profile, wherein the outer profile comprises an elliptical shape comprising a major diameter and a minor diameter, wherein the major diameter is larger than the minor diameter in length; wherein the major diameter is between 0.5% and 10% larger than the minor diameter in length; and
  coupling a second end of a piston to the rod piston end of the rod end, wherein a first end of the piston, opposite the second end, is configured to be coupled to an actuator housing.

18. The method of claim 17, further comprising coupling the rod joint end of the rod end to an outer cylinder of the landing gear assembly.

\* \* \* \* \*